April 10, 1928.
C. G. STRANDLUND
1,665,330
LATERAL SWING CONTROL FOR TRACTOR DRAWN PLOWS
Filed Oct. 1, 1923    2 Sheets-Sheet 2
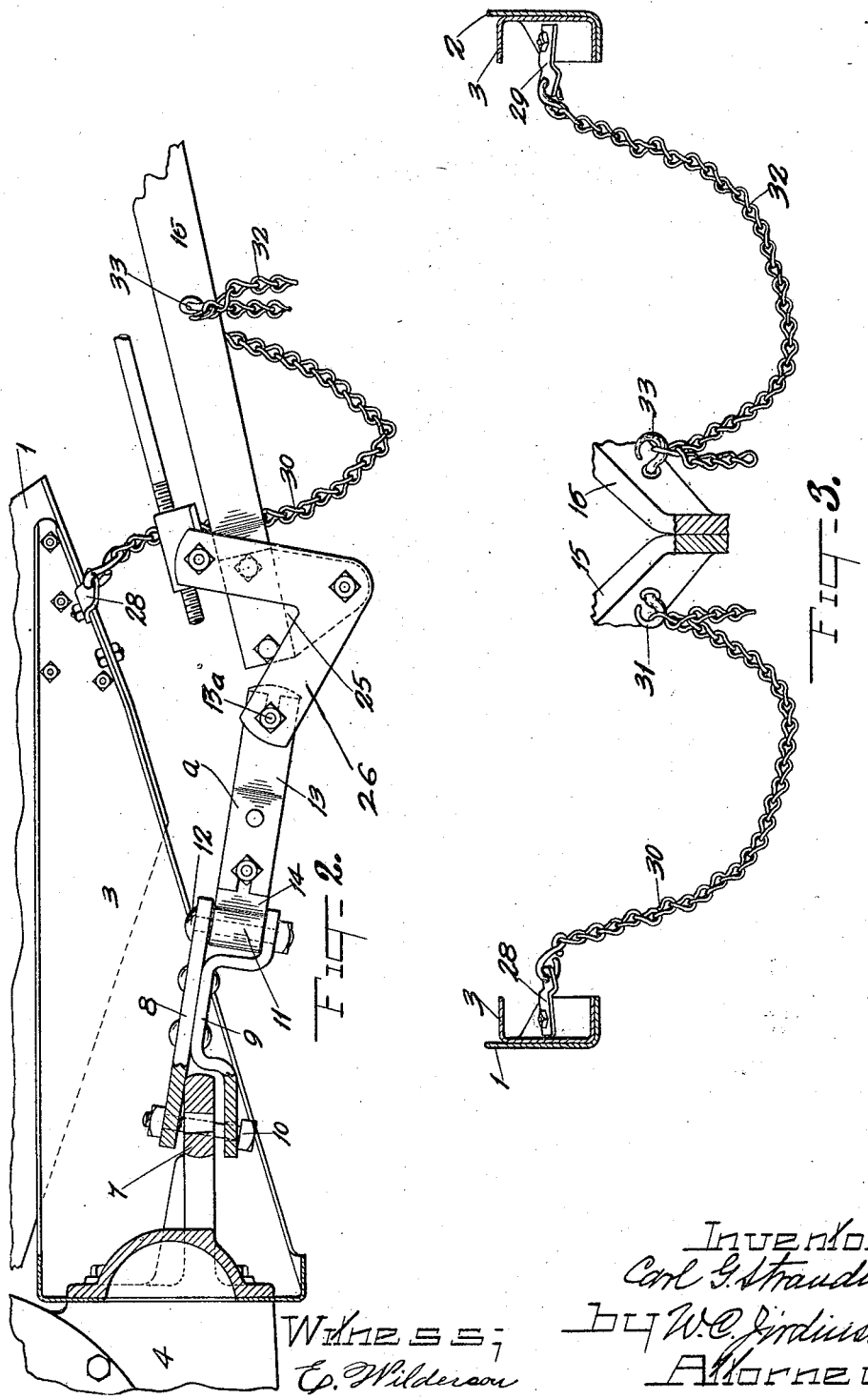

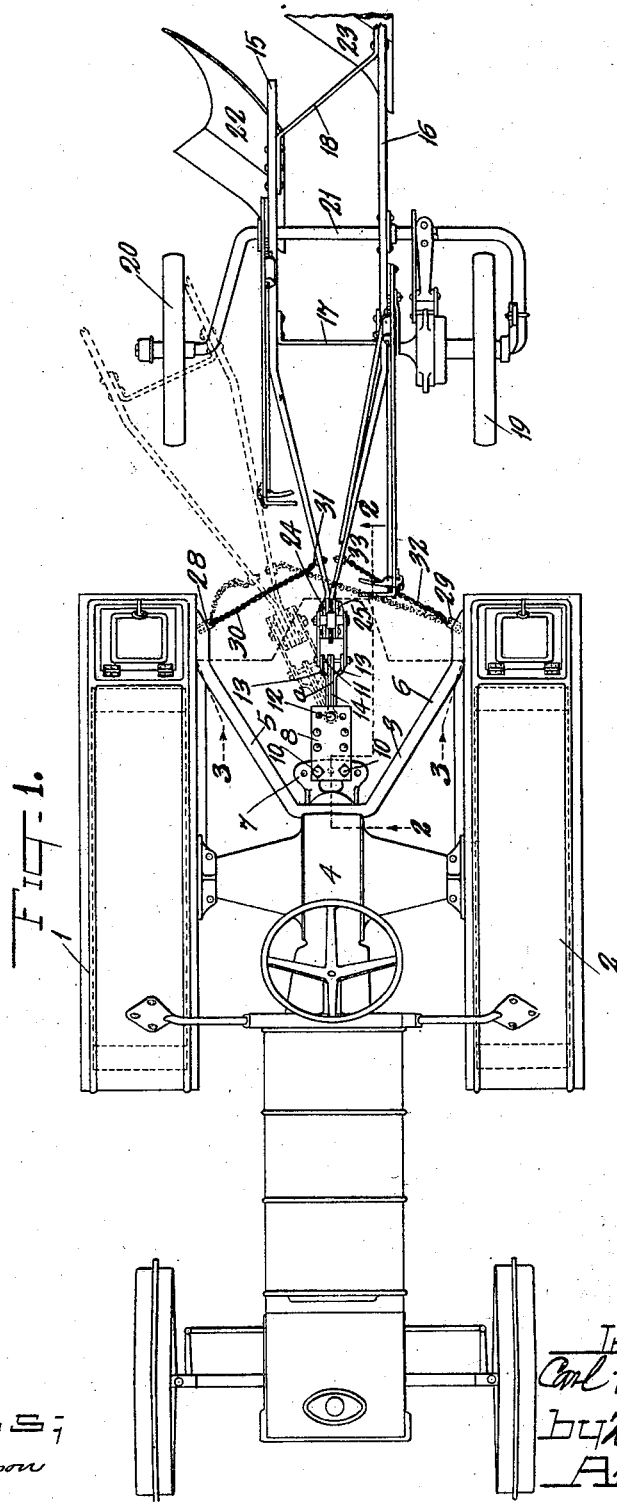

Patented Apr. 10, 1928.

1,665,330

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

LATERAL-SWING CONTROL FOR TRACTOR-DRAWN PLOWS.

Application filed October 1, 1923. Serial No. 665,898.

My invention relates to power drawn vehicles, particularly plows and the means employed to control lateral swinging movement thereof.

Referring to the drawings in which similar numerals indicate identical parts—

Figure 1 is a plan view of a tractor and a plow attached thereto and embodying my invention. Figure 2 is an enlarged detail section on the line 2—2 of Figure 1, and Figure 3 is an enlarged detail section on the line 3—3 of Figure 1.

Sufficient of a tractor and plow is shown to illustrate the application of my invention, fenders 1 and 2 covering the rear wheels of the tractor, shown only in dotted lines. A V-shaped yoke 3, of channel steel, is secured to the rear of the differential housing 4 by suitable bolts, the arms 5 and 6 of the yoke extending horizontally toward the fenders 1 and 2 respectively to which they are securely bolted. A horizontally disposed clevis 7 is mounted on the housing 4 centrally thereof and is held in place by the bolts which secure the yoke 3 to the housing. A shackle composed of an upper plate 8 and a lower plate 9 is secured to the clevis by bolts 10 which pass through holes in both plates and the clevis 7. The lower plate 9 is riveted centrally to the plate 8 and its front portion is bent to extend under the clevis 7, the rearward end is bent downwardly and rearwardly to provide a space for the reception of an end of a link 11 pivotally held therein by a vertical bolt 12, said link being composed of a bar bent upon itself, to form an eye for reception of the bolt 12. There are also straps 13, which are bolted to the main part 14 of the link and on opposite sides thereof and terminate rearwardly in alinement with the rearward end of the part 14 and spread apart therefrom.

The plow shown includes a frame composed of beams 15 and 16 spaced apart and rigidly connected by braces 17 and 18. Land and furrow wheels 19 and 20 are journaled on a crank axle 21 on which the frame is supported by suitable bearings. Plow bodies 22 and 23 are mounted on the rear of the beams 15 and 16 respectively. The beams 15 and 16 converge forwardly and are bolted between downwardly extending plates 24 and 25 to the lower ends of which respectively are pivotally secured V-shaped members 26 and 27 pivotally connected to the straps 13 by a horizontal pivot 13ª about which the plow is freely movable vertically. A bracket arm 28 is secured by a bolt on the rear portion of the arm 5 of the yoke 3 and a similar bracket arm 29 is secured on the rear portion of the arm 6. A chain 30 has one end hooked in an eye in the bracket 28 and extends loosely to a hook 31, on the beam 15, to which it can be connected by any one of its links. A similar chain 32 is attached to the bracket arm 29 and extends loosely to a hook 33, on the beam 16, to which it can be attached by any one of its links. The plow can be offset toward either side of the tractor when desired, a series of holes in the clevis 7 and also in the shackle a being provided for that purpose.

As shown in the drawings, the plow is attached to the tractor on a central longitudinal line and because of its pivotal connection with the shackle 8—9, it is capable of swinging laterally to accommodate itself to variation of the tractor from a straight line. To limit the lateral swinging movement of the plow, particularly if the tractor is backing for the purpose of making a sharper turn of the plow when changing the direction of operation, or to clear the plow of an obstruction, I provide the chains 30 and 32, connected to the tractor and to the frame of the plow rearward of the horizontal pivot of the latter; the chains are normally slack, as shown in the drawings, and can be shortened or lengthened to vary the swing of the plow in either or both directions and irrespective of its position relative to the central longitudinal line of the tractor. By connecting the chains to the plow frame at a point rearward of the horizontal pivotal connection of the frame with the tractor, the strength of the connection is materially aided when the tractor is backing or turning.

What I claim is—

1. The combination with a tractor, of a plow pivotally connected therewith for vertical and horizontal movement and free to swing vertically, a member secured to the tractor having diverging portions extending rearwardly toward the tractor and secured thereto, and a chain attached to the rear of said portions respectively and extending in slack condition to the plow frame and attachable thereto rearward of the horizontal pivot thereof.

2. The combination with a tractor, of a plow pivotally connected therewith for free vertical and limited horizontal movement, a yoke horizontally disposed and mounted on the rear of the tractor, the arms of said yoke diverging and their rearward portions secured to the tractor, a chain attached to the rear portion of each arm and extending in slack condition rearwardly toward the plow frame, and a hook on each side of the frame rearward of the horizontal pivot, said chains adapted to be connected at varying points in their length to said hooks.

3. The combination with a tractor, of a plow attached thereto by a vertical pivot and free to swing laterally in either direction, a yoke horizontally disposed and secured to the rear of the tractor, the arms of said yoke diverging and secured to the tractor at their rearward ends, a chain secured to each arm and extending in slack condition toward the plow, and a hook on each side of the plow frame adapted to be connected to said chains at varying points on the latter whereby the slack of the chains can be varied to vary the lateral swing of the plow.

4. The combination with a tractor, of a plow pivotally connected therewith by a vertical and a horizontal pivot, and chains attached to the tractor and to the plow frame rearward of the horizontal pivot of the latter.

5. The combination with a tractor, of a plow pivotally connected therewith by a vertical and a horizontal pivot, and chains attached to the tractor and to the plow frame rearward of the horizontal pivot of the latter, said chains being normally slack.

CARL G. STRANDLUND.